May 1, 1962 J. W. BARRINGTON 3,031,925
TEMPLE HINGE FOR SPECTACLE FRAMES
Filed July 2, 1958

INVENTOR:
JOHN W. BARRINGTON
BY:
ATTORNEY

United States Patent Office 3,031,925
Patented May 1, 1962

3,031,925
TEMPLE HINGE FOR SPECTACLE FRAMES
John W. Barrington, 303 Adams St., Decatur, Ga.
Filed July 2, 1958, Ser. No. 746,201
2 Claims. (Cl. 88—53)

This invention relates to a temple hinge for spectacle frames, and more particularly concerns a hinge construction which permits quick attachment and removal of temples without interfering with the conventional folding movement of the temples that facilitates handling and storage.

While certain quick-disconnect type hinges for spectacles have been proposed in the past, such arrangements have generally required resilient separation of certain of the hinged arms to permit interlocking of the frame and temple hinge elements. Such resilient hinge constructions lack rigidity, but are nevertheless satisfactory for certain types of inexpensive sunglasses, goggles and the like. It has been found, however, that where the spectacles must be worn during the major portion of each day, it is more desirable to maintain a rigid union between the temples and the spectacle frame so as to provide a substantially constant relation between the frame lenses and the line of sight of the user's eyes. Conventional constructions providing such high-quality hinge arrangements usually utilize a shoulder screw or like pinion element as the pivot member of the hinge. Consequently, the assembly of frames and temples by the manufacturer is a relatively time consuming operation. But even after such manufacturer's assembly, opticians, who must necessarily supply various size temples so as to fit the requirements of the individual users, often find it necessary to replace or exchange such temples for a proper fitting. It will readily be appreciated that, in either instance, the requirement of removing and replacing the screws or pinion elements is often a tedious and bothersome operation.

One of the objects of this invention, therefore, is to provide a new and improved temple hingle for spectacle frames which permits the temples to be quickly and easily attached to and removed from the frame member.

Another object of this invention is to provide a new and improved temple hinge for spectacle frames which, while permitting the usual folding or swinging function of the temples with respect to the frame member, eliminates the usual screws or pinion elements forming the pivot for the temples and other separate fastening means.

A further object of this invention is to provide a new and improved temple hinge for spectacle frames in which the temples are rigid with respect to the frame member, as in higher-quality type hinges, but which permits the quick attachment or removal thereof by a simple one-motion operation.

Still another object of this invention is to provide a new and improved temple hinge for spectacle frames which is simple in construction and operation and readily lends itself to the demands of economic manufacture.

Other objects and advantages of my invention will become apparent from the following description taken in conjunction with the accompanying drawings wherein like designators refer to the same or similar parts throughout, and in which.

Figure 1:
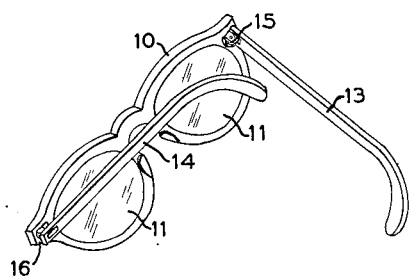
FIG. 1 is a perspective of a spectacle embodying the hinge construction of the present invention and showing one of the temples in such folded position as would permit disassembly or disconnection thereof from the frame member.

Referring now more particularly to the drawings, the numeral 10 indicates a spectacle frame having lenses 11 mounted therein, and temples 13 and 14 pivotally attached thereto as by the hinges 15 and 16, each of which is constructed in accordance with the invention. The base member 18 of hinge 15 is secured as by rivets 19 to frame 10, and may be more particularly characterized by lower and upper yoke arms 20 and 21, respectively. Lower yoke arm 20 is provided with an upwardly projecting spherical boss 22 formed in any suitable manner as by a stamping operation which would cause indentation 23 in the lower surface thereof. Upper yoke arm 21 is provided with a ball detent member 28 which is retained in the socket of tubular cell 24 as against outward pressure of resilient member 29 by inwardly turned lower lip 25. Member 29 is preferably rubber, but as is well understood by those skilled in the art, could be a spring or any other suitable resilient device. The tubular cell 24 is press-fitted into the upper yoke arm so as to provide for simple and economic construction of the hinge. The arrangement is such that the upper spherical ball and lower boss form confronting projections, with upper projection or ball detent 28 being selectively compressible upwardly into tubular cell 24 of upper yoke arm 21.

Figure 2:
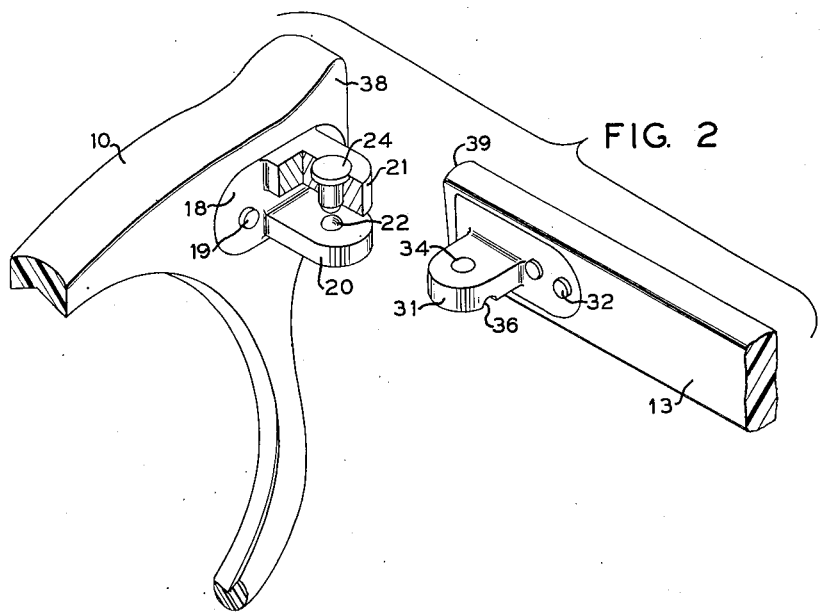
FIG. 2 is an exploded perspective, partly in cross section, showing the hinge of the present invention disassembled.
Figure 3:
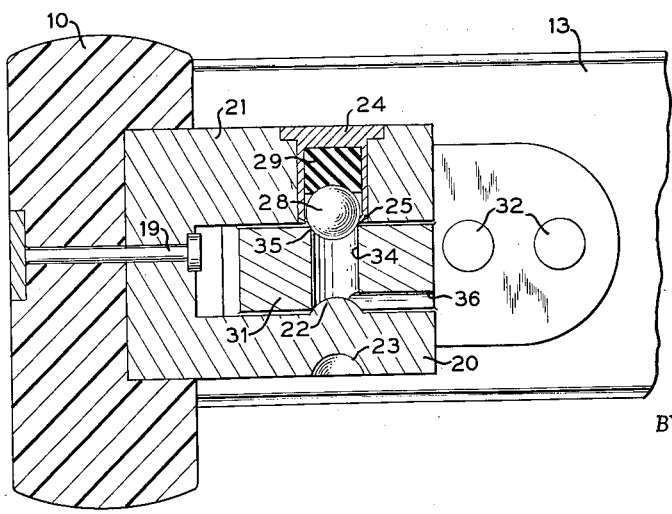
FIG. 3 is a vertical cross sectional view, partly broken away, showing a hinge construction according to my invention assembled.

Pivotally engaging frame hinge member 18 is the temple hinge lug member 31 which is suitably secured as by rivets 32 to temple 13, as more clearly seen in FIG. 2. Lug 31 is formed with a central bore 34, the upper portion 35 of which is adapted for registration with ball detent 28, and the lower portion is adapted for registration with the stationary boss 22, the arrangement being such that temple 13 may be freely pivoted or folded inwardly against frame 10, while yet maintaining a high degree of rigidity between the temple and frame members. The lower end of bore 34 communicates with a groove 36 extending rearwardly, parallel to temple 13, opening out to the side wall of the lug member 31 so as to permit passage of the stationary boss 22 in attaching or detaching a temple from the frame. It is to be noted that with the hinge completely assembled the construction is such that detent ball 28 is slightly compressed into resilient member 29, with the result that ball 28 maintains a constant force or bearing pressure against the upper periphery of central bore 34 in lug 31 so as to increase the rigidity between the hinge elements.

To detach a temple from a frame member utilizing the hinge of the present invention, it is first necessary to swing the temple about its pivot through approximately a quadrant to its folded position against frame 10 so as to provide maximum separation of the normally abutting ends 38 and 39 of the frame and temple, respectively, as shown by temple 14 in FIG. 1. Subsequent application of oppositely directed force between the two members, as by movement of temple 14 in a plane parallel to that of the frame away from hinge 15, will force the ball 28 of hinge 16 into its socket so as to permit boss 22 on lower arm 20 to slidably register in groove 35, thereby allowing the temple to be detached from the hinge base of the frame in a simple, one-motion operation. In like manner, to attach temple 14 to frame 10, it is only necessary to position the temple in a plane parallel to that of the frame, with temple lug 31 of hinge 16 between the lower and upper yoke arm 20 and 21 of the base hinge member. Subsequent movement of the temple in that plane toward hinge 15 causes slidable registration of lower boss 22 with lug groove 36, as ball detent 28 is forced up into the socket of tubular cell 24. At the completion of such movement, boss 22 and detent 28 are positioned coaxially in central lug bore 34 so as to permit temple 14 to be swung outwardly until frame end 38 is abutted by temple end 39, whereupon the spectacle is ready for wearing.

It will readily be recognized that such arrangement permits a rigid, bearing tight union to be maintained between the frame and temple hinge members so as to provide a substantially constant relation between the frame lenses and the user's eyes, while at the same time permitting quick assembly and/or disassembly thereof as required in manufacturing and fitting operations.

From the foregoing it will be apparent that I have provided a new and improved temple hinge for spectacle frames which is well adapted to fulfill the aforestated objects of the invention. Moreover, whereas the invention has been disclosed in detail with respect to a single embodiment thereof which gives satisfactory results, it will be apparent to those skilled in the art to which this invention most nearly appertains, that additional embodiments and modifications thereof may be resorted to without departing from the spirit or scope of the invention as defined by the appended claims.

I claim:

1. In combination with the frame and temple of a spectacle, means for permitting disengagement of the temple from the frame including first and second hinge members attached to said frame and said temple respectively and being relatively pivotable over approximately a quadrant for swinging movement of said temple from extended position with one end abutting the frame to folded position with respect to said frame, said first hinge member including upper and lower yoke arms spaced apart to form a slot therebetween, a stationary projection and a resiliently movable projection disposed in coaxial relation on said arms and facing said slot, said second hinge member including a lug removably received in said slot, said lug defining upper and lower recesses for reception of said stationary projection and said movable projection respectively, said lug also defining a groove extending outwardly in substantially parallel alignment with said temple from the recess in which said stationary projection is received to the periphery of said lug for sliding movement of said lug with respect to the projections to remove the temple from the frame when said temple is in folded position.

2. In combination with the frame and temple of a spectacle, means for permitting disengagement of the temple from the frame including first and second hinge members attached to said frame and said temple respectively and being relatively pivotable over approximately a quadrant for swinging movement of said temple from extended position with one end abutting the frame to folded position with respect to said frame, said first hinge member including upper and lower yoke arms spaced apart to form a slot therebetween, a stationary projection and a resiliently movable projection disposed in coaxial relation on said arms and facing said slot, said second hinge member including a lug removably received in said slot, said lug defining a bore for reception of said stationary projection and said movable projection in opposite ends thereof, said lug also defining a groove extending outwardly in substantially parallel alignment with said temple from said bore to the periphery of said lug for reception of said stationary projection to permit sliding movement of said lug with respect to the projections to remove the temple from the frame when said temple is in folded position.

References Cited in the file of this patent

UNITED STATES PATENTS

| | | |
|---|---|---|
| 2,305,562 | Thompson et al. | Dec. 15, 1942 |
| 2,671,379 | Eloranta | Mar. 9, 1954 |
| 2,786,390 | Zanetti | Mar. 26, 1957 |

FOREIGN PATENTS

| | | |
|---|---|---|
| 551,160 | Italy | Nov. 16, 1956 |
| 907,403 | France | June 25, 1945 |
| 1,126,049 | France | July 23, 1956 |